May 2, 1972  E. D. ELIZALDE  3,660,482
JOINT FOR SHEET ELEMENTS
Filed May 16, 1969
4 Sheets-Sheet 1
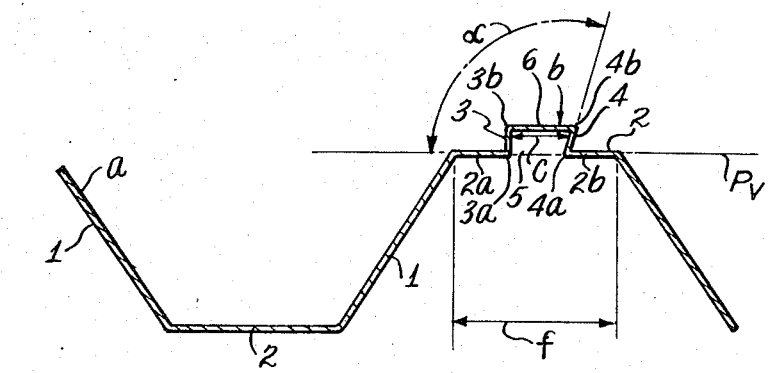
Fig. 1.
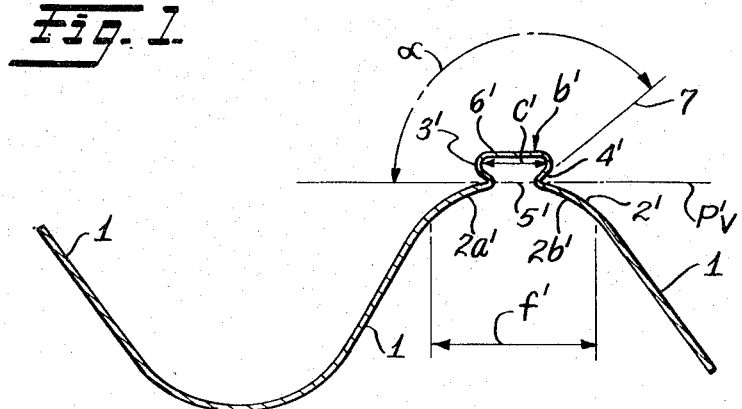
Fig. 2.
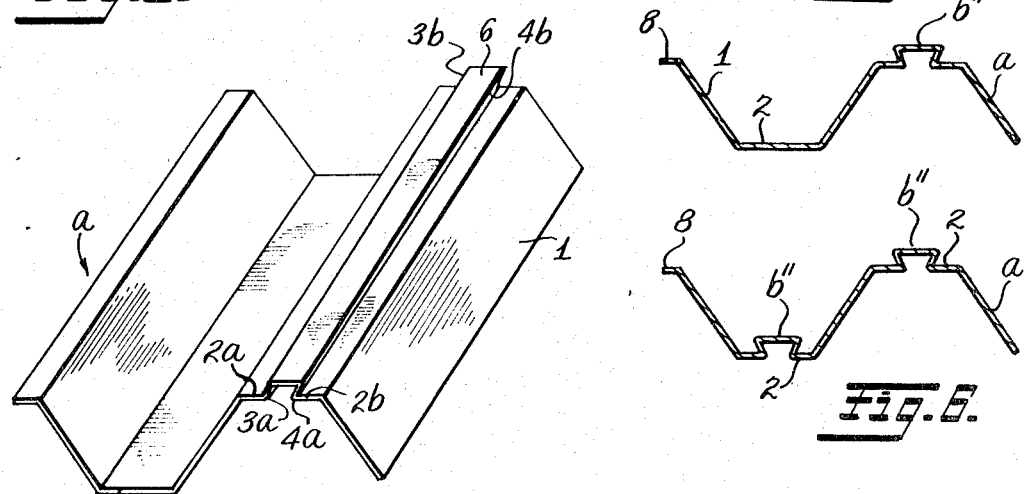
Fig. 3.
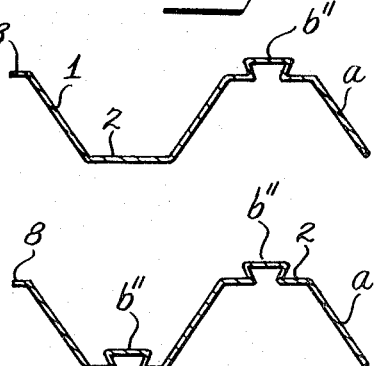
Fig. 5.
Fig. 6.
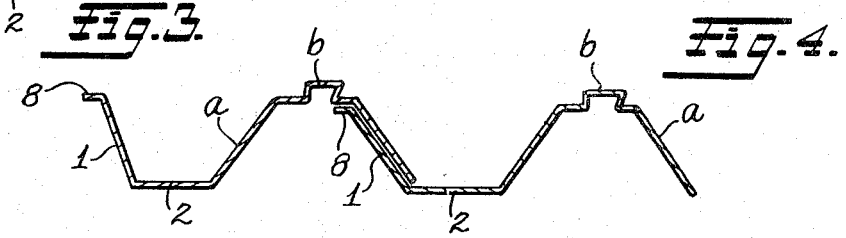
Fig. 4.

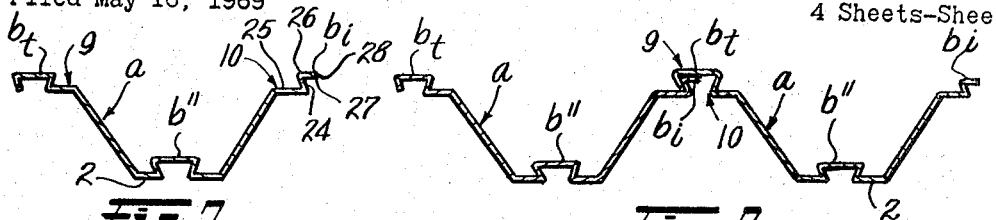
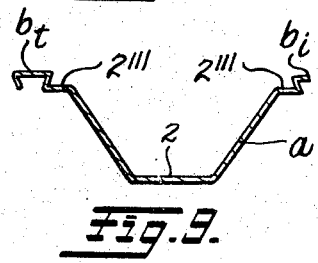
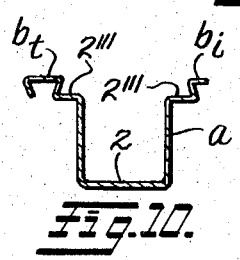
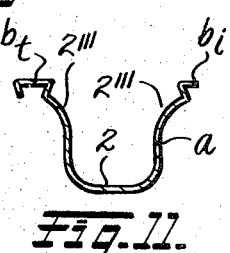
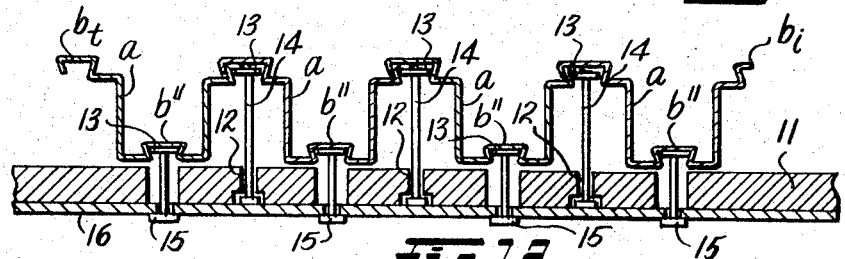
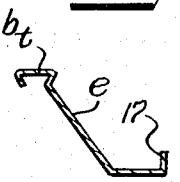
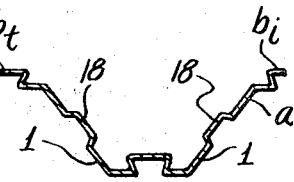
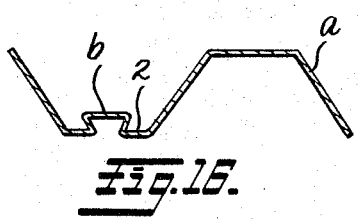
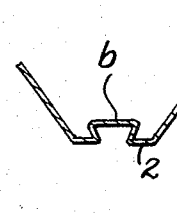
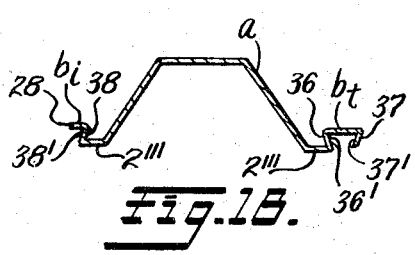
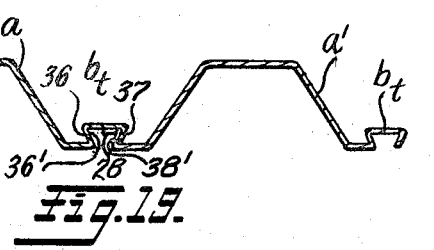

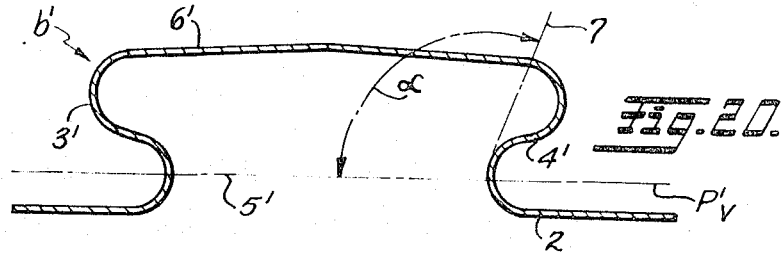
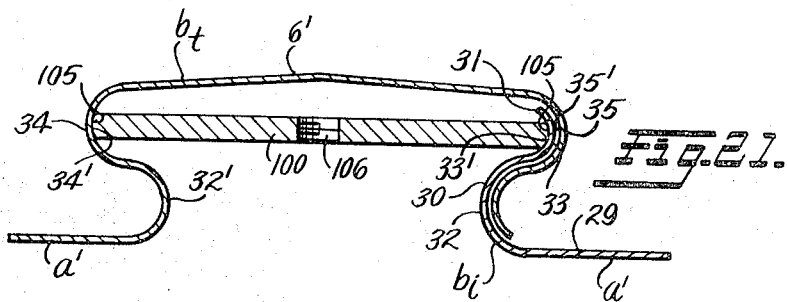
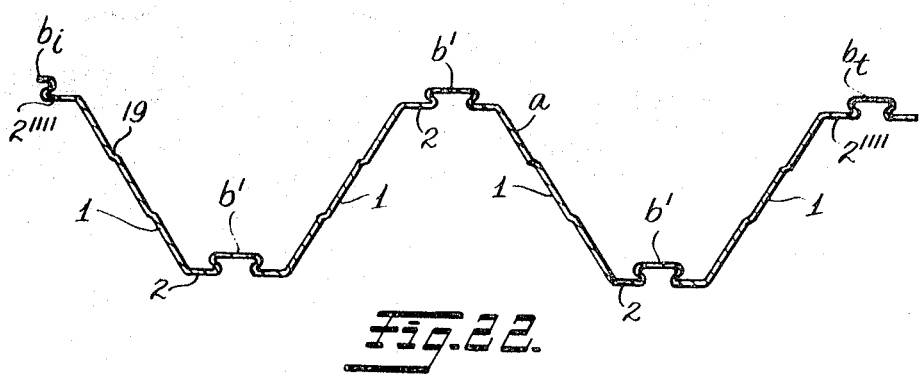
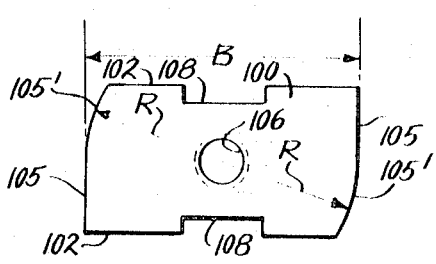
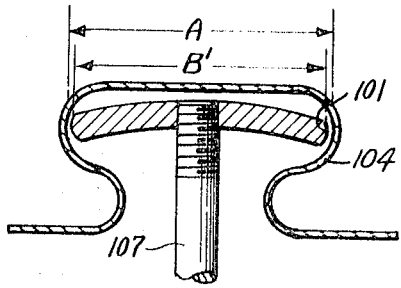
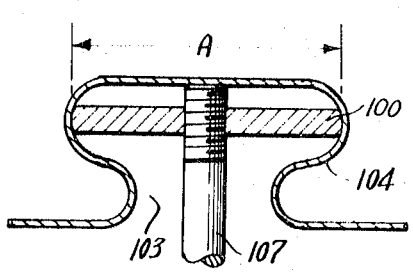
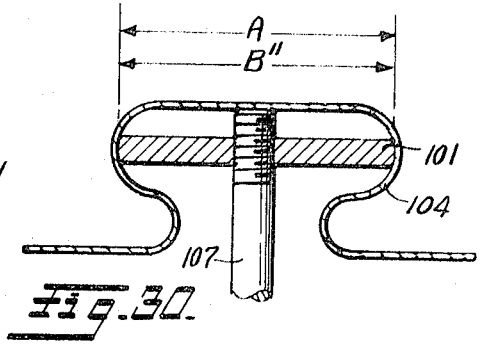

May 2, 1972  E. D. ELIZALDE  3,660,482
JOINT FOR SHEET ELEMENTS
Filed May 16, 1969  4 Sheets-Sheet 4

United States Patent Office 3,660,482
Patented May 2, 1972

3,660,482
JOINT FOR SHEET ELEMENTS
Eduardo Delfin Elizalde, Esmeralda 135,
Buenos Aires, Argentina
Filed May 16, 1969, Ser. No. 825,185
Claims priority, application Argentina, May 28, 1968,
214,388, 214,389
Int. Cl. E04d 1/06, 1/34
U.S. Cl. 52—537                10 Claims

ABSTRACT OF THE DISCLOSURE

A structure formed of at least two sheet elements, each having a joining section, with the joining section of the first element superposed over the joining section of the second element. The joining section of the first element has an open substantially complete and uniformly cross-sectioned longitudinally extending channel whose inner maximum width is greater than the opening of the channel insert and the joining section of the second element has a channel insert at least partially received in the channel of the first element to form an assembly of the elements. A clamping plate is positioned in the channel of the assembled elements to provide transverse clamping pressure between the wall of the channel insert and the walls of the channel of the first element. The clamping plate is a generally oblong body formed with two diagonally opposed rounded off corners, the greatest width of the plate not exceeding the width of the opening of the channel and the length of the plate being greater than the maximum inner width of the channel of the assembly before the plate is positioned in the channel, the plate providing the transverse clamping pressure when the length of the plate extends transversely of the channel of the assembly.

The present invention refers to improved corrugated or ondulated sheet elements for divisional structures, to structures comprised of such elements, for example screens, partitions, walls or roofs either self-supporting or not, and to clamping plates for such elements and/or structures.

The disadvantages of the generally known corrugated or ondulated sheet elements, be these made of iron sheets or any other suitable materials, are fully known to the builders and users, and are due principally to the fact that such corrugated sheets must be superposed at their transversal as well as their longitudinal borders when used as components of a divisional structure, must be perforated in order to be joined one to the other and to their supporting means, thus giving rise to water leakage and the penetration of dust while, on the other hand, these ondulated iron, aluminium or fibrous concrete sheets, after having been used for a determined structure, cannot be used for a structure or roof of differing dimensions.

It is true that there exist on the market roofs built-up of special ondulated iron sheets which, designed and prepared ex-profeso by the builders or architects, are mutually joined by means of welded joints thus providing a self-supporting and absolutely leak-proof roof structure, in which the disadvantages recited hereinabove are not present anymore. However, it will be understood that roofs of this type, though extremely satisfactory from a technical standpoint, are of considerably higher cost as those erected on the basis of the generally known corrugated iron or aluminium sheets and this, sometimes, puts a heavy economical burden on the user.

Apart from the above, the known corrugated sheet elements as well as those of special design used for leak-proof self-supporting roofs present the common disadvantage that none of these corrugated or ondulated sheets permits the attachment of additional means or equipment to the structure of which these sheets are forming part, it being impossible to mount on said structures for instance ceilings, gas, water or electrical conduits, and artifacts without avoiding the use of perforations or without avoiding the necessity of welding to such sheets the required support elements.

On the other hand, when the corrugated or ondulated sheet elements of common type or of the aforementioned special design are used for roofing, of the usual or of the self-supporting types, either common or special bolts have to be used for which perforations have to be provided in the supporting means and in the individual corrugated sheets, in the case of the common supported roofs, or the entire self-supporting roof structure has to be welded or otherwise anchored to the supporting walls or beams, this constituting a further technical complication which is reflected in the ultimate cost of such roofs.

These and all other inconveniences of the divisional structures of the supported or of the self-supporting type, well known to all experts and users, are avoided if recourse is had to the improved ondulated sheet elements according to the present invention, the novel structural features of which reside in that at least one of the transversal portions of one of the ondulations of these elements is provided with a groove or channel which, extending substantially over the entire length of said transverse portion, has an inner width which is smaller than the imaginary width of said transverse portion and is provided with at least one side wall which, at least in the portion of the imaginary basis thereof, forms an angle larger than 90°, as seen from the inside of the channel with respect to the imaginary plane of the elongated opening of said channel.

The meaning of the terms and/or expressions used for defining the characteristic structural features of the improved ondulated sheet elements according to the present invention, as regards the scope of the latter, will be fully explained hereinafter and also with reference to the figures of the accompanying drawings and more in particular with reference to schematic FIGS. 1 and 2 thereof.

On the other hand, the clamping plates according to the present invention, to be used for the mounting of the improved ondulated sheet elements and/or structures according to the present invention are characterized in that the same are constituted by a strip-shaped, preferably metallic body the width of which between the longitudinal borders thereof is substantially equal to the width of the longitudinal aperture or opening of the channel of said ondulated sheet element in which it must be anchored, the transversal borders thereof being separated by a distance substantially equal to the inner width of said channel at the anchoring point of the sheet element, the diagonally opposite corners of the strip-shaped body being rounded off along imaginary circles that maximum radii of which are substantially equal to half of said distance between the transversal borders of said body, which thus can be easily introduced in the longitudinal position thereof, in one of said channels where, by means of an approximately 90° rotation, the strip-shaped body is locked with the transversal borders thereof in pressure contact with the side walls of the channel.

Thus, one of the main objects of the present invention is to provide an improved ondulated sheet element which can be easily assembled and disassembled without permanent disfiguration and thus can be used repeatedly without limitation.

Another object of the present invention is to provide improved ondulated sheet elements which, when mutually joined by locked superposition of adjacent channels, form practically hermetically closed structures.

A further object of the present invention consists in providing improved ondulated sheet elements which can be easily manufactured in any desired lengths, thus avoiding the necessity of overlapping transversal joints between individual elements.

Another object of the present invention is to provide improved ondulated sheet elements which, when assembled to form a structural unit, such as a partition or roof, permit the attachment of additional elements or accessories to such structure without disfiguration of the sheet elements and also in an easily dismountable manner.

A further object of the present invention, is to provide improved ondulated sheet elements which, once assembled, form a structural unit which cannot be disassembled from the outside, since the joining and/or clamping means are not accessible from the exterior.

Still another object of the present invention is to provide divisional partitions formed of a plurality of improved ondulated sheet elements according to the present invention, having uniform and homogeneous aspects from any of the sides of such elements.

A further object of the present invention is to provide roofs capable of extending over appreciable lengths (larger than 3 m.) and capable of supporting the usual loads without the necessity for supports or intermediary stiffening means.

Still another object of the present invention consists in providing practically horizontal roof structures, due to the height of the ondulations and the mutual superposed and locked relationship between overlapping channels in the upper bottoms of the ondulations.

Another object of the present invention is to provide a clamping plate which can be easily mounted and dismounted in the channels, whether superposed or not, of the improved ondulated sheet elements according to the present invention and which are capable of constituting additional locking means between sheets having superposed channels.

These and other objects and advantages of the present invention will become apparent in the course of the present description showing several preferred embodiments of the ondulated sheet elements and of the anchor plates according to the present invention, as described with reference to the accompanying drawings wherein:

FIG. 1 is a schematic view of the transversal cross section of an improved ondulated sheet element according to the present invention in one of the basic embodiments thereof.

FIG. 2 represents a schematic cross section of another embodiment of an improved ondulated sheet element according to the present invention.

FIG. 3 is a perspective view of the improved ondulated sheet element of FIG. 1, in one of the variants thereof, while FIG. 4 represents a schematic cross section of two assembled improved ondulated sheet elements according to the present invention.

FIG. 5 illustrates schematically a cross section of a variant of an improved ondulated sheet element of FIG. 1, while FIG. 6 corresponds to a variant of the sheet element of FIG. 5.

FIGS. 7 and 8 correspond to embodiments of an improved ondulated sheet element according to the present invention, designed for assemblage by mutual locked superposition of their channels.

FIGS. 9, 10 and 11 illustrate improved ondulated sheet elements according to the present invention, each formed by a unique wave or ondulation of different profile and the borders of which are provided with channels of the type shown in FIGS. 7 and 8.

FIG. 12 illustrates schematically a divisional structure in the form of a roof constituted by a plurality of improved ondulated sheets elements according to the present invention, showing also the union of the clamping means of the elements to the support means of the structure and the means for supporting the ceiling thereon.

FIGS. 13 and 14 illustrate schematically in cross section two terminal members for a roof structure of the type shown in FIGS. 7 and 8, or 9, 10 and 11.

FIG. 15 illustrate schematically a modified embodiment of the improved ondulated sheet element of FIG. 9, while FIG. 16 shows an improved ondulated sheet element in which the sole channel is provided in the lower transverse portion of the ondulated element, FIG. 17 illustrating schematically and in cross section a roof structure formed by two ondulated sheet elements of FIG. 16.

FIG. 18 illustrates schematically and in cross section a variant of an improved ondulated sheet element according to the present invention, wherein the transverse portion on each side of the sole ondulation of the element is provided each with locking channels, as shown also schematically in FIG. 19.

FIG. 20 shows schematically and in cross section the preferred profile of the channel used in those improved ondulated sheet elements according to the present invention which are manufactured by corrugating long strips.

FIG. 21 illustrates schematically and in cross section the mutually locked joint between two ondulated elements as shown in FIG. 20.

FIG. 22 shows schematically and in cross section a different embodiment of the improved ondulated sheet element according to the present invention designed specially for self-supporting roof structures.

FIG. 23 illustrates schematically and in cross section a clamping plate according to the present in its position in a channel of an improved ondulated sheet element according to the present invention.

FIG. 24 is a plan view of one embodiment of a clamping plate according to the present invention, while FIGS. 25, 26, 27 and 28 illustrate the manner in which a clamping plate according to the present invention is placed and locked in a channel, as viewed from the aperture thereof.

FIGS. 29 and 30 illustrate schematically and in cross section another preferred embodiment of the clamping plate according to the present invention, and finally.

Figure 31:
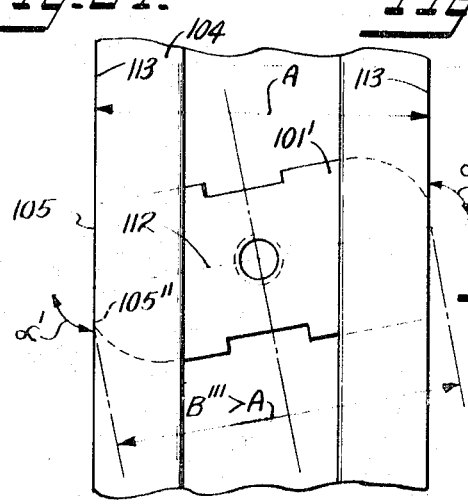

FIG. 31 illustrates schematically a further preferred embodiment of an anchoring or clamping plate according to the present invention.

In the drawings, the same reference numerals or letters designate identical or corresponding elements or parts.

As can be observed in FIG. 1, in one of the basic embodiments thereof, the improved ondulated sheet element according to the present invention is constituted by a sheet $a$ of adequate material, for instance iron or aluminum, bent to form two adjacent half-waves with side walls 1 and flate transverse portions 2 (as seen in cross-section) and which can be plate or slightly bent in the longitudinal direction thereof.

In general, the material of sheet $a$ of FIG. 1, as well as that of the other improved ondulated sheets according to the present invention, is constituted by an adequate metal, for instance iron or aluminum, but it will be understood that these sheets $a$ can be also made from one of the various adequate synthetic materials, capable of being formed in accordance with the salient structural features of these improved ondulated elements.

This element, in the embodiment thereof shown in FIG. 1, is provided at the transverse portion 2 thereof, designed to correspond to the exterior of element $a$, i.e. at the upper transverse portion of the sheet as seen in the drawing, when such element is used for the erection of a divisional structure, with a channel $b$ which, is formed as an integral part of the material of sheet $a$. Transverse portion 2 comprises generally horizontal body portions $2a$ and $2b$ from which depend the open substantially complete and uniformly cross-sectioned longitudinally extending channel $b$ which extends substantially over the entire length of the respective transverse portion and has a maximum inner width $c$ which is smaller than the imaginary width $f$ of said transverse portion 2. The channel $b$ is defined by a pair of opposed, transversely spaced apart longitudinally extending lateral side walls 3 and 4, side wall 3 having a front edge 3a joined to body portion 2a and a rear edge 3b, side wall 4 having a front edge 4a joined to body portion 2b and a rear edge 4b, and a longitudinally extending web 6 interconnecting the rear edges 3b and 4b of said side walls 3 and 4, said web 6 defining the bottom of the channel b. The spacing apart of the side walls 3 and 4 adjacent their front edges defines the opening 5 of the channel. Side wall 3 is approximately perpendicular with respect to transverse portion 2, while the opposite side wall 4 of channel b forms an angle $\alpha$ which, seen from the inside of channel b, is larger than 90° with respect to the imaginary plane indicated by the interrupted reference line $p_v$ in FIG. 1 and which corresponds to the elongated opening 5 of channel b.

The expression "maximum inner width c" of channel b, used in the present case, should be understood as referring to the inner width of this channel in the proximity of the bottom 6 thereof, and it will be evident that the novel characteristic feature of channel b is that said width should be always larger than the width of the elongated opening 6 of channel b.

With respect to improved ondulated sheet elements in accordance with the present invention having curved transverse portions and/or side walls, such as illustrated for instance in FIG. 2, it will be understood that the expression "maximum inner width" of channel b' will be the distance indicated by reference c' in the latter figure, distance which corresponds to the location of a support and clamping means to be placed at different longitudinally spaced apart points in the interior of the channel.

On the other hand, while in the improved ondulated sheet element shown in FIG. 1, the expression "imaginary width" f of transverse portion 2 refers to the real width of such transverse portion, i.e. the distance between the fold lines which are clearly formed between plane transverse 2 and side walls 1 of sheet a, the same expression, in the case of improved ondulated sheet elements with curved transverse portions 2', as illustrated in FIG. 2, should be understood as referring to that transversal extension of these curved transverse portions which, designated by reference f' in this figure, could be regarded as pertaining to the transverse portion in which is formed channel b'.

In the embodiment of the improved ondulated sheet element shown in FIG. 1, channel b possesses rectilinear side walls 3, 4 and bottom 6, as viewed in cross section. However, and as illustrated schematically in FIG. 2, such channel b' can be provided with curved side walls 3' and 4', for instance S-shaped, without falling outside the scope of the present invention, since also in these embodiments the maximum inner width c' of the channel must be smaller than the imaginary width f' of curved transverse portion 2' of the sheet element and larger than the width of the longitudinal opening 5' of the channel. Bottom web 6' of channel b' can be rectilinear with respect to the cross section thereof, as shown in FIG. 2, or can show any other adequate configuration, for instance it can be slightly curved towards the exterior of the groove and body portion 2a' and 2b' are joined to the respective front edges of side walls 3' and 4'.

When the improved ondulated sheet elements according to the present invention are provided with one or more channels of the type b', i.e. with one or both curved side walls, angle $\alpha$ larger than 90° which this wall must form with the imaginary plane $p_v'$ corresponding to the elongated opening 5' of the same groove, must be measured, in the cross sectional plane of the channel, between the line indicating such imaginary plane $p_v'$ and a line 7 which corresponds, approximately, to the salient inclination towards the exterior, of an imaginary base portion of the wall of the channel, as can be clearly observed in FIG. 2. In this connection, the expression "imaginary base portion of the wall" used in the present specification and claims with reference to the determination of angle $\alpha$ should be understood as referring to that portion of the side wall of the channel which, without being located in the immediate adjacency of the union the front edge of the side wall to the body portion, can be regarded as representative of the general inclination towards the exterior of said side wall, with respect to the interior of said channel. It can be also said that, in general, the expression "an angle larger than 90° between at least the imaginary base portion of the side wall of the channel and the imaginary plane of the elongated opening of the same" used in the present specification and claims has, as a main aim thereof, to specify that, basically and with respect to the cross section thereof, channels b' of the improved ondulated sheet elements according to the present invention, must have at least one side wall which, figuratively speaking, is inclined towards the exterior when observed from the inside of the channel and in the elongated opening thereof.

In this connection it should be mentioned that imaginary plane $p_v$ which corresponds to the plane of each channel opening 5 can be regarded as passing through the plane which coincides with the minimum separation between the opposed portions of the side walls of the channel, so that for channels with S-shaped side walls, such imaginary plane $p'_v$ is located higher than the transverse portion of the element where such groove is provided, as can be observed in FIG. 2.

It must be also mentioned that, furthermore, for channels of curved, for instance S-shaped side walls, the angle larger than 90° can be also equal to 180°, or be even larger.

The improved ondulated sheet elements according to the present invention, described hereinabove with reference to FIGS. 1 and 2, are illustrated only with respect to the cross sections thereof, and it should be understood that these elements show configurations or transversal ondulations which are identical throughout the entire longitudinal extensions thereof, as shown schematically in FIG. 3. In this connection the expression "longitudinal extension of the transverse portion of the element", used in the present specification and claims, should be read as referring to that dimension of these channeled elements corresponding to the length of their ondulations or ondulation. Therefore, when in the present specification and/or claims reference is made to the "width" of the improved ondulated sheet elements according to the present invention, this term designates the distance comprised between the free longitudinal borders or rims of these elements and measured transversal and perpendicularly with respect to the imaginary longitudinal axes of such ondulations.

As will be easily understood on the basis of the preceding description and explanations referring to FIGS. 1 and 2, the improved ondulated sheet element according to the present invention, is characterized, in the basic embodiment thereof, by the fact that at least one of the transverse portions of one of the ondulations of such element a presents a channel b or b' which, extending substantially over the entire length of the respective transverse portion 2 or 2' (independently of the cross sectional configuration of such transverse portion), has a maximum inner width c or c' which is smaller than the imaginary width f or f' of said transverse portion and has at least one side wall 4 or 4' which, at least at the imaginary base portion thereof, forms an angle $\alpha$ larger than 90°, as seen from the inside of channel b or b', with respect to the imaginary plane $p'_v$ of the elongated opening 5 or 5' of this channel, so that necessarily, the maximum inner width c or c'', of channel b or b', respectively, results larger than the width of this opening 5 or 5', respectively.

As has been stated hereinbefore, the improved ondulated sheet elements according to FIG. 1 as well as those according to FIG. 2, are designed in such a manner that their transverse portion 2 or 2', provided with channels b or b', respectively, are located on the exterior, when these elements are used for partitions, such as for example roof structures whether self-supporting or not. The manner in which these improved ondulated sheet elements of the type shown in FIG. 1 are joined one to the other, is illustrated schematically in FIG. 4, where it can be observed that ascending left side wall 1 of ondulated element $a$ at the right is fitted under the descending side wall 1 of ondulated element $a$ at the left, and so successively. When a roof formed by such ondulated sheet elements, assembled as shown schematically in FIG. 4, is anchored to the supporting structure or beams through the use of fastening means which will be described more in detail with reference to FIG. 12 and FIGS. 23 to 31, these improved ondulated sheet elements $a$ become mutually joined and locked in a leak-proof and practically inviolable manner from the exterior, and the individual ondulated sheet elements which have been used already for assembling a divisional structure, such a roof, can be disassembled quite easily and used for another structure due to the absence of any perforations and/or welded joints in respectively between these ondulated sheets.

The improved ondulated sheet element $a$ according to the present invention and shown schematically in FIG. 4 is provided, at the free border of the left flank 1 thereof, with a partial transverse portion rim 8 extending over the entire length of the ondulated element, and the width of which is equal to a fraction of the width of complete transverse portion 2. Rim 8 provides a coupling joint between adjacent ondulated sheets which is more resistant and leak-proof than those formed between sheets as shown in FIGS. 1 and 2, but it will be easily understood that such partial transverse portion rims or flanges do not affect the basic structural features of the improved ondulated sheet elements according to the present invention.

The ondulated sheet elements shown in FIG. 5 is distinguished by the fact that in channels $b''$ thereof, both side walls form angles larger than 90° with respect to the imaginary plane of the channel opening, this making it easier to fasten the clamping means between the ondulated sheet elements and the supporting structure.

The improved ondulated sheet elements according to the present invention illustrated schematically in FIG. 6 are provided with channels $b''$ in each of the transverse portions 2 thereof, both channels being arranged in the same direction. In this embodiment, channels $b''$ are identical but it will be easily understood that these channels can be of different types without falling outside the scope of the present invention, as long as they show the characteristic structural features of the present invention. When ondulated sheet elements according to FIG. 6 are used for attaching auxiliary means and aparatus to the upper channels $b''$ can be used as fastening places for the clamping means which anchor the roof to the supporting structure or beams, while the lower channels $b''$ can be used for attaching auxiliary means and apparatus to the floor, for instance ceiling plates, water, gas and electricity conduits, etc.

With respect to the improved ondulated sheet element of FIGS. 4, 5 and 6, which possesses at the order of one flask thereof, a rim 8, it should be mentioned that such rim 8 corresponds to a fraction of the complete transverse portion of an ondulation of the respective sheet element. Therefore, when in the present specification and claims the expression "transverse undulation" is used in relation to the eventual presence of a channel therein, this expression should be understood as covering, with the scope thereof, all these embodiments of the improved ondulated sheet elements in which the channels are provided in complete transverse portions (i.e. those located between two side walls of sheet $a$) as well as those located in incomplete transverse portions (i.e. those joined only at one of the borders thereof to a flank of sheet $a$), such incomplete transverse portions having widths which can be practically equal to those of complete transverse portions, as well as smaller widths, all this within the scope of the main object of the present invention.

In the same manner, when the present specification and/or claims the term "groove or channel" is used and when it is expressed that such groove or channel is provided with a least one side wall which, viewed from the inside of the channels, forms an angle larger than 90° with respect to the imaginary plane of the channel opening, such expression should be understood within the scope of the present invention as covering those channels of the complete type i.e. those possessing two opposed side walls of the complete type, as well as those channels of the incomplete type, i.e. which are provided with only one side wall.

FIG. 7 illustrates schematically an embodiment of an improved ondulated sheet element according to the present invention constituted by only one ondulation and provided with a complete channel $b$ in the complete transverse portion 2 thereof, and having two rims or incomplete transverse portions or joining sections 9 and 10. Incomplete transverse portion 9 is bent over to show the configuration of a complete terminal channel $b_t$, while incomplete transverse portion 10 ends with an incomplete terminal $b_i$ which, in general and preferably, will show a width equal to a fraction of the total width of complete terminal channel $b_t$. Thus the improved ondulated sheet elements according to the present invention of FIG. 7 permit a perfect mutually locked assembly of adjoining sheet elements, since as can be clearly observed in FIG. 8, when such improved sheet elements are used for the erection of roofs, incomplete terminal channel $b_i$ of the joining section 10 of elements $a$ is introduced in a lateral direction, from below, into complete terminal channel $b_t$ of the joining section 9 of adjacent element $a$, so that, as a consequence of the particular cross sectional configuration of channels $b''$ and after all ondulated sheet elements have been joined one to the other and to the supporting structure through clamping means placed in those channels formed by the superposition of terminal channels $b_t$ and $b_i$, a perfect muaually locked, leak-proof and inviolable union is obtained between all ondulated sheet elements of such roof structure.

As shown in FIGS. 7 and 8, the incomplete channel $b_i$ of joining section 10 has only one side wall 24 whose front edge is joined to the body portion 25 of the joining section. Joined to the rear edge 26 of side wall 24 there is a partial or short bottom 27 which terminates in a free edge 28. The external transverse width of the incomplete channel $b_i$, that is, the transverse distance between the right hand extremity (the free edge 28 in FIG. 7) and the left hand extremity (the rear edge 26 in FIG. 7), is less than the width of the opening of the complete channel $b_t$ so that the incomplete channel can be laterally inserted into or removed from, the complete channel through the channel opening of the complete channel. Since the incomplete channel is received within the complete channel, the incomplete channel $b_i$ can be called a channel insert.

In this connection it should be mentioned that the term "groove or channel" used in the present specification and claims should be understood as referring, as regards to the scope thereof, not only to the complete channels provided in the complete transverse portions of the sheet element ondulations, but also to the terminal channels, whether complete or incomplete, the types $b_t$ or $b_i$, respectively, illustrated schematically in FIGS. 7 and 8.

On the other hand, it must be mentioned that improved ondulated sheet elements according to the present invention, provided with a complete terminal channel $b_t$ and an incomplete terminal channel $b_i$ but the complete transverse portions 2 of which do not posses a channel, as shown in FIGS. 9 and 10, are fully comprised within the scope of the present invention, since the same include the basic structural features of these elements according to the present invention, namely that at least one of the transverse portions of the ondulations of the sheet (in the present example both incomplete upper transverse portions $2'''$) are provided each with a channel at least one of which is provided with an inclined side wall in accordance with the specifications stated hereinabove.

As an illustrative embodiment of a divisional structure, in the present case a roof, which can be easily and rapidly erected by using improved ondulated sheet elements in accordance with the present invention of the type shown in FIG. 10, but provided also with complete channels $b''$, is shown schematically in FIG. 12, where it can be seen that such roof comprises several support beams 11 of which only one is shown in the drawing. The roof assembly is obtained by laterally inserting and mutually locking ondulated elements $a$ with their terminal channels $b_i$ in terminal channels $b_t$ of the adjacent sheet, thus obtaining a transversal mutual locking, resistant and impermeable, of all ondulated elements $a$ of the roof. Beams 11 are provided with perforations 12 in front of locked channels $b_t$ and $b_i$ and clamping plates 13 are introduced into these channels, with screw bolts 14 screwed into said plates and in said beams 11. Thus, all ondulated sheet elements of the roof are firmly anchored to beams 11, said plates 13 operating simultaneously as locking means for the superposed channels. Between beams 11, other clamping plates 13 are inserted in the lower or base channels $b''$ of ondulated elements $a$ and, by means of screw bolts 15, the ceiling plates are suspended from ondulated sheet elements $a$ of the roof structure.

Terminal members $d$ and $e$, shown schematically in FIGS. 13 and 14, can be used to adequately complete the roof structure, as shown in FIG. 12. In fact, the left terminal members $d$ possesses in the upper border thereof an incomplete terminal channel $b_i$, while the lower border thereof ends with a drainage channel 17. The right terminal member $e$ is provided, at the upper border thereof, with a complete terminal channel $b_t$, while its lower border ends also with a drainage channel 17. As will be easily understood, these terminal members make it possible to complete adequately the roof structure shown in FIG. 11 or any other roof constituted of improved ondulated sheet elements provided, at the free borders thereof, with complete or incomplete terminal channels.

In the improved ondulated sheet elements according to the present invention, the flanks 1 of which are of a relatively large height, more in particular in the improved ondulated sheet elements used for the erection of self-supporting roofs, these flanks can be reinforced against bending and denting by the provision of one or more steps 18 in each of these flanks or side walls, as shown schematically in FIG. 15.

For some special applications, such as room partitions, improved ondulated sheet elements of the type schematically shown in FIG. 16 can be used, where it can be observed that these elements, formed by a sheet $a$ of two halfwaves or ondulations, are provided with a complete channel $b$ only in lower transverse 2, thus permitting a firmer clamping of the partition structure constituted of a plurality of such sheet elements, as shown schematically in FIG. 17. For applications of the same type, there can be used also ondulated elements $a$ of FIG. 18 which, formed of only one ondulation, possess in each of its incomplete transverse portions $2'''$ a terminal channel of the complete type $b_t$ and the other of the incomplete type $b_i$, or channel, these elements being mutually locked for the formation of partition structures in the manner shown schematically in FIG. 19. The incomplete channel $b_i$, or channel insert, is similar in configuration to the channel insert of FIGS. 7 and 8 and includes a partial channel bottom, one end or edge of which is joined to the rear edge of the side wall and the other edge of which is free.

FIG. 20 illustrates, on an enlarged scale, the cross section of a channel $b'$ which is used in practice in a particular embodiment of the improved ondulated sheet elements according to the present invention. As can be seen in the figure, side walls $3'$ and $4'$ of channel $b'$ are formed by two semicircular adjacent portions of opposite curvature and with substantially equal curvature radii, while bottom $6'$ of the channel is bent substantially in the form of an inverted very open V. As can be clearly observed in the drawing, both side walls $3'$ and $4'$ of channel $b'$ comply with the condition imposed that the angle formed between which corresponds approximately to the inclination of a side wall and the imaginary plane $p'_v$ of opening $5'$ of the channel, must be larger than 90°, as seen from the inside of the latter. Channels $b'$ of the type shown in FIG. 20, jointly with the ondulated sheet elements $a$, of which these channels form an integral part, can be manufactured using roller corrugators and starting with long strips of, for instance, iron which then are cut transversally to obtain sheet units of the desired length.

FIG. 21 shows schematically a complete terminal channel $b$, of an ondulated sheet element $a$ in its locked position with the incomplete terminal channel $b_i$ or channel of adjacent ondulated element $a'$, this also on an enlarged scale. In this modification the body portion 29 of the joining section of sheet $a'$ has dependent therefrom the lateral side wall 30 having a rear edge 31, said rear edge being the free edge of the insert so that in this modification the channel insert does not include any partial channel bottom as do the embodiments of FIGS. 7, 8, 18 and 19. The external transverse width of this channel insert is the transverse distance between the left hand extremity (bulge 32 in side wall 30) and the right hand extremity (bulge or projection 33) and this distance is less than the width of the channel opening of complete channel opening $b_t$.

Sheet element $a$ of multiple ondulations according to the present invention, shown schematically in FIG. 22, is designed for the formation of self-supporting roof structures and comprises, in each of the three complete transverse portions 2 thereof, a complete channel $b'$ of the type illustrated in FIG. 20, while the incomplete side walls $2''''$ thereof, located in a common plane, are provided one with a complete terminal channel $b_t$ and the other with an incomplete terminal channel $b_i$ of the type shown in FIG. 21, side walls 1 of element $a$ being provided with two reinforcing steps 19, as can be seen in FIG. 22.

On referring to FIG. 12, it has been described how the improved ondulated sheet elements according to the present invention can be joined to a supporting structure or beams by means of clamping plates 13. In this figure, the shape of these clamping plates has been shown in a very schematic manner, and therefore the clamping plates according to the present invention will be described more fully hereinbelow with reference to FIGS. 23 to 31 of the accompanying drawings.

As can be seen in FIGS. 23 and 24, the clamping plate according to the present invention is formed by a strip-shaped generally oblong body 100, rectilinear and preferably metallic, but which can also be made of one of the available synthetic materials of sufficient strength, delimited by two longitudinal borders 102. The distance between said longitudinal borders 102 defines the maximum width of the plate 100. The width of the clamping plate is equal to or slightly smaller than the width of the opening 103 of groove, or channel 104, for which this clamping plate has been designed.

In this embodiment, the transverse borders 105 of body 100 are, in their major portion, perpendicular to longitudinal borders 102 and the distance B between them that is, the length of the seats, is substantially equal to the inner width A of channel 104. Two of the diagonally opposite corners of body 100 are rounded off at $105'$ to allow for a rotation of the clamping plate at the inside of channels 104, from its position of insertion, shown in FIG. 25 towards its perpendicular clamping or locking position, shown in FIGS. 23 and 28.

In this embodiment of the clamping plate according to the present invention shown in FIG. 23 and as can be observed in FIG. 24, the radius of curvature R of rounded-off portions $105'$ of transversal borders 105, correspond each to the half of the inner width A of channel 104 at the point where this clamping plate must be placed. However, it will be understood that these portions 105' can be rounded-off in accordance with radii of smaller magnitude, provided that said curvatures allow for a rotation of the plates 100 in the interior of channels 104, without meeting with an invincible resistance.

The clamping plate according to the present invention, in the embodiment of FIGS. 23 and 24, is provided with union means for a screw bolt, constituted by a central threaded perforation 106 in which the threaded end of bolt 107 can be easily introduced, as shown schematically in FIG. 23. However, it will be understood that the union means shown in the attached drawings constitute only one of the various possible variations of such means which can be used according to the present invention.

In the embodiment of clamping plate 100 shown schematically in FIGS. 23 and 24, the screw bolt 107 can be used for obtaining a stronger locking between clamping plate 100 and the walls of channel 104. With this purpose in view, it is sufficient to introduce bolt 107 in clamping plate 100 till the end thereof located in the channel contacts the bottom of the latter. On exercising a pressure with this end of the bolt 107 against the bottom of groove 104 an extremely firm and locked relation between clamping plate 100 and side walls of channel 104 is obtained.

To facilitate the placing of clamping plate 100 in its locking position within channel 104 in the embodiment shown in FIGS. 23 to 31, longitudinal borders 102 of body 100 are provided with opposite cuts 108 where a lever or wrench can be placed for turning clamping plate 100 till the final clamping position thereof as shown in FIG. 23 is reached. However, it will be understood that body 100 of the clamping plate can be provided with other seat means for an auxiliary tool to be used for rotating easily this clamping plate towards the final locked position thereof.

Figure 25:
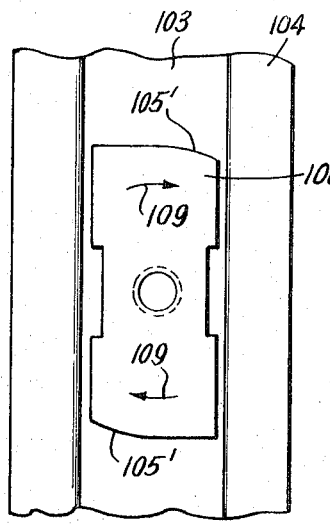
Figure 26:
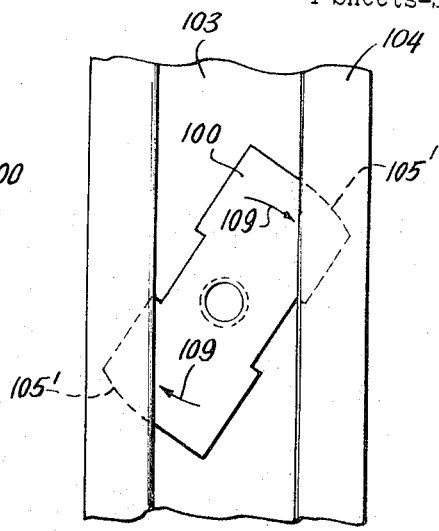
Figure 27:
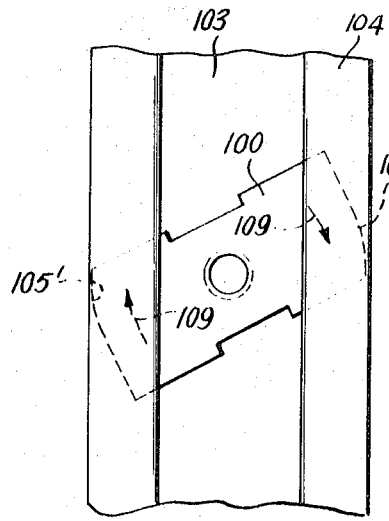
Figure 28:
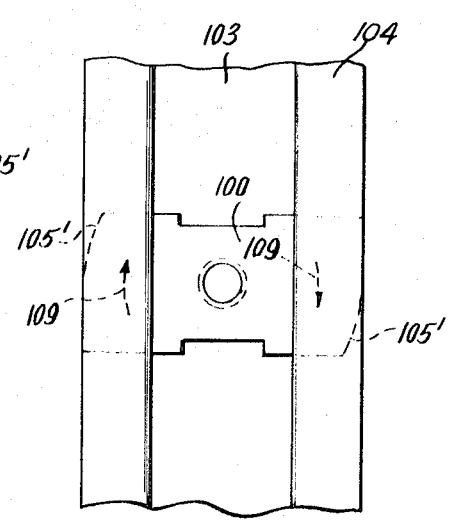

To position clamping plate 100 into channel 104, the plate is introduced into the channel through channel opening 103 with the length of the plate extending longitudinally of the channel, as shown in FIG. 25. Since the greatest width of the plate 100 does not exceed the width of the channel opening, the plate, in this position, can be inserted into the channel or removed therefrom through the channel opening. Then, by means of a tool (not shown), the clamping plate 100 is rotated about 90° in the direction shown by arrow 109 from the position of FIG. 25 to its final clamping or locking position shown in FIG. 28, wherein the length of the plate extends substantially transversely of the channel. During its rotation the plate passes through the positions shown in FIGS. 26 and 27. Due to the rounded-off configuration of corners 105', clamping plate 100 enters into a sliding contact with the inner surfaces of channel 104, as can be observed in FIG. 27, and once clamping plate 100 has reached the final position thereof, shown in FIG. 28, the transversal borders 105 of body 100 become locked against the inner surfaces of channel which define the maximum inner width of the channel 104, thus maintaining the clamping plate firmly in this locked position. It is apparent that in the final position, borders 105 provide transverse clamping pressure urging the inner surfaces of the channel away from each other and thereby locking the plate in the channel.

When channel 104 is of the type formed by superposed profiled borders of two adjacent sheet elements, it will be easily understood that clamping plate 100 according to the present invention also functions as a mutual locking means for these two superposed sheet elements.

It will be appreciated that when two elements are joined to each other, as shown in FIGS. 8, 12, 19 and 21, each element has at least one joining section with the joining section of one element being superposed over that of the other element. The assembly of FIG. 8 uses the elements of FIG. 7 and the assembly of FIG. 19 uses the elements of FIG. 18. Each joining section includes a body portion and a channel (complete or incomplete) joined thereto. The complete channel $b_t$ of one element has two opposed lateral side walls connected by a bottom web. The incomplete channel, or channel insert $b_i$, of the other element has one lateral side wall with or without a partial bottom web depending therefrom with either the side wall (in the absence of the bottom) terminating in a free edge or the bottom web terminating in a free edge.

In the embodiments of FIGS. 8, 12, 19 and 21, both side walls of the complete channel and the single side wall of the channel insert from an angle larger than 90° with respect to the plane of the opening of the channel. Stated differently, each side wall of the complete channel has, rearward of its front edge, rearward of its front edge, a longitudinally extending portion (for example, 34 and 35 in FIG. 21 and 36 and 37 in FIG. 18) projecting outwardly or transversely away from the other side wall thereof with the opposed inner surfaces (34' and 35' of FIG. 21 and 36' and 37' of FIG. 18) of said portions being transversely spaced apart a distance greater than the opening of the channel and defining the maximum inner width of the complete channel. In a similar manner the single side wall of the channel insert has a longitudinally extending portion (for example, 33 in FIG. 21 and 38 in FIGS. 18 and 19) projecting transversely away from the free edge (for example, 31 in FIG. 21 and 28 in FIGS. 18 and 19) of the channel insert toward the body portion of the channel insert.

When the complete channel element $a$ is superposed over the channel insert of element $a'$ (as shown in FIGS. 19 and 21, for example), the channel insert is received within the complete channel to provide an assembly of the joining sections wherein the maximum inner width of the channel of the assembly is the transverse distance between the innert surface (33' in FIG. 21 and 38' in FIG. 19) of the projecting portion of the side walls of the channel insert and the inner surface (34' in FIG. 21 and 36' in FIG. 18) of the projecting portions of the side wall of the complete channel opposed thereto.

The cross sectional shape of the channel insert is sufficiently similar to that of the corresponding portion of the channel which receives said insert so that the projection of the insert can at least be partially received within the projection of the wall of the complete channel. The channel insert is locked into the complete channel, as illustrated in FIG. 21, by means of a clamping plate 100 whose greatest width does not exceed the width of the opening (the space between bulge 32 of the insert and bulge 32' of the complete channel) of the channel of the assembly so that the plate can be inserted into the assembly channel or removed therefrom through the opening. When the plate 100 is rotated about 90° from its insertion position to the clamping position wherein the length of the plate extends substantially transversely of the channel of the assembly, the opposite borders 105 of the plate provide transverse clamping pressure urging the inner surface 33' of the projecting of the side wall of the channel insert away from the inner surface 34' of the projection of the side wall of the complete channel which is opposed to the projection of the insert. The plate in this position also urges the projecting portion of the channel insert toward the inner surface 35' of the side wall of the complete channel which is adjacent the channel insert. This transverse clamping pressure of the clamping plate locks or clamps the joining sections of the two elements together. It is apparent that in order for the clamping plate to exert this clamping pressure the length of the plate must be greater than the maximum inner width of the channel of the assembly before the clamping plate is positioned in the channel of the assembly. To separate the elements the clamping plate is rotated about 90° from its locking position whereby the clamping plate can be removed through the opening of the channel of the assembly.

It is very easy to withdraw a clamping plate according to the present invention from a channel in which it has been locked for this it suffices to rotate the plate in a direction opposite to arrows 109 and for this the cited auxiliary tool can be used.

As can be seen in FIGS. 23 to 28, the locking rotation of clamping plate 100 is carried out in a clockwise direction. It will be understood that this sense of rotation depends on the location of the rounded-off corners of the plate, and that plates can be provided within the scope of the present invention that have an opposite sense of rotation. However, in practice clamping plates 100 of the type described with reference to FIGS. 23 to 28 will be preferred in view of the fact that the sense of rotation thereof is that generally accepted for right hand screws and similar means.

In the embodiment of the clamping plate according to the present invention shown schematically in FIGS. 29 and 30, the same is formed by a strip-shaped body 101, which is slightly curved or bowed in the longitudinal direction thereof. In the first place, the advantage is obtained that curved clamping plates 101 can be used in all those relatively important cases where the internal width of the clamping channels is subject to variations, while in second place this modified embodiment of clamping plate can be also used in channels provided in rigid materials, such as stone, marble and the like. This due to the fact that separation B' bewteen the transversal borders of the plate in the inoperative condition thereof, measured in direct line, is substantially equal to or slightly smaller than width A of channel 104, as can be observed in FIG. 29, but that in the final clamping position of this plate, shown in FIG. 30, distance B" between the transversal borders of flattened plate 101 is larger than width A of channel 104, the side walls of which are pushed outside in the clamping or locked position of plate 101.

In order to still improve the final locked position of clamping plate 101 in channel 104, the internal end of screw bolt 107 can be screwed into plate 101 till the same presses against the bottom of channel 104, as can be observed in FIG. 30.

It will be understood that clamping plate 100 as well as clamping plate 101 can be both used for attaching additional artifacts, such as ceiling plates, water, gas and electricity conduits and the like.

FIG. 31 illustrates schematically a further embodiment of clamping plate 101' according to the present invention, the longitudinal axis 112 of which in the locking or clamping position, forms with respect to the inner longitudinal borders 113 of the groove an angle α' which is smaller than 90° and the transversal borders 105 of which are provided with salients 105", for which the mutual separation B''' is larger than width A of channel 104. Thus, when clamping plate 101' according to the present invention is rotated counterclock-wise with a view of bringing the same into the final locking posiiton thereof, there exists an intermediate point at which a substantially higher than usual resistance has to be overcome, which is due to the larger separation B''' between salients 105." After having passed this point of higher resistance, clamping plate 101' arrives at the final locking position, the position shown in FIG. 31, thereof which is fully sufficient for the purpose of the present invention. However, due to the presence of salients 105", clamping plate 101' cannot turn back from the final locking position thereof due to vibrations of the ondulated sheet elements or similar phenomena.

It is to be understood that the invention is not to be limited to the particular embodiments thereof, as described with reference to the accompanying drawings, and that other modifications and variations as those described are fully comprised within the scope of the present invention, as defined in the appended claims.

1. A structure comprising
  (a) at least two sheet elements,
  (b) each element having at least one joining section with said joining section of the first of said elements superposed over said joining section of the second of said elements, said elements being joined at said joining sections.
  (c) said joining section of said first element comprising a body portion and an open substantially complete and uniformly cross-sectional longitudinally extending channel joined thereto, said channel being defined by a first longitudinally extending lateral side wall having a front edge and a rear edge, a second longitudinally extending lateral side wall transversely spaced apart from said first side wall and opposed thereto having a front edge and a rear edge, a longitudinally extending web interconnecting the rear edges of said side walls, said web defining the bottom of said channel, the front edge of the second of said side walls joined to said body portion, the spacing apart of said side walls adjacent said front edges defining the opening of said channel, each side wall having rearward of said front edge a longitudinally extending portion projecting transversely away from the other side wall, said longitudinally extending portion of said first side wall being opposed to that of said second side wall so that the opposed inner surfaces of said longitudinally extending portions are transversely spaced apart a distance greater than the width of said opening and defining the maximum inner width of said channel.
  (d) said joining section of said second element comprising a body portion and a uniformly cross-sectioned longitudinally extending channel insert defined by at least a longitudinally extending lateral side wall having a front edge joined to said body portion of said second element and a rear edge, said channel insert having a longitudinally extending free edge remote from said front edge, said side wall of said second element having rearward of said front edge a longitudinally extending portion projecting transversely away from said free edge toward said body portion,
  (e) the transverse width of said channel insert not exceeding the width of the opening of said channel of said first element whereby said channel insert can be positioned into, or removed from, said channel through said channel opening by moving one of said elements generally laterally relative to the other, the cross-sectional shape of said channel insert being sufficiently similar to the corresponding portion of said channel adjacent one of said first and second side walls so that said projection of said insert can at least be partially received within said projection of said one of said first and second side walls,
  (f) said elements being superposed with said channel insert being positioned in said channel to provide an assembly wherein the maximum inner width of the channel of the assembly is the transverse distance between the inner surface of the projecting portion of said side wall of the channel insert and the inner surface of the projecting portion of the other of said first and second side walls,
  (g) clamping means in the channel of the assembly between said inner surfaces defining said maximum inner width of the channel of the assembly providing transverse clamping pressure urging said inner surfaces away from each other and urging the projecting portion of said channel insert toward the inner surface of the projection of said one of said first and second side walls to lock said elements to each other,
  (h) said clamping means comprising at least one clamping plate constituted by a generally oblong body formed with two diagonally opposed rounded off corners, the greatest width of said plate not exceeding the width of the opening of the channel of the assembly so that said plate can be inserted into said channel, or removed therefrom, through said opening when the length of said plate extends substantially longitudinally of said channel, and the length of said plate being greater than the maximum inner width of channel of the assembly before the clamping plate is positioned in said channel, whereby when said plate is inserted into said channel and rotated from the insertion position approximately 90° to the clamping position wherein the length of said plate extends transversely of said channel, said plate will provide said transverse clamping pressure, (i) said clamping plate being in said clamping position.

2. A structure according to claim 1, wherein said clamping plate is metallic and is slightly curved in its longitudinal direction so that its ends bow away from the bottom of the channel of the assembly, at least when said plate is inserted into said channel.

3. A structure according to claim 1, wherein said plate is provided with clamping means for an auxiliary tool to rotate said plate.

4. A structure according to claim 1, wherein said clamp-plate is provided with means for securing an attachment thereto.

5. A structure according to claim 1, wherein said plate is provided with a substantially central threaded bore.

6. A structure according to claim 5, wherein said bore extends through the thickness of said body and a threaded bolt is displaceably located in said bore, one end of said bolt abutting, as a pressure means, against the inner surface of the bottom of the channel of said assembly.

7. A structure according to claim 1, wherein said lateral side walls of said complete channel are substantially straight and are rearwardly angled away from each other.

8. A structure according to claim 1, wherein said lateral side walls of said complete channel define opposite and substantially identical S-shaped cross-sections.

9. A structure according to claim 1, wherein the free edge of said channel insert is defined by the rear edge of the lateral side wall of said insert.

10. A structure according to claim 1, wherein said channel insert includes a transversely extending web defining a partial bottom, one edge of said web being joined to the rear edge of the side wall of said insert and the other edge of said web defining said free edge.

References Cited

UNITED STATES PATENTS

| | | | |
|---|---|---|---|
| 3,059,739 | 10/1962 | Cochran | 52—718 |
| 3,104,739 | 9/1963 | Munse | 52—718 |
| 3,120,686 | 2/1964 | Pickering | 52—718 X |
| 3,377,759 | 4/1968 | Booth | 52—478 X |
| 3,452,500 | 7/1969 | Heirich | 52—478 |
| 2,172,270 | 9/1939 | Ansel | 52—520 |
| 2,180,504 | 11/1939 | Bradfield et al. | 52—591 X |
| 475,854 | 5/1892 | Fugman | 52—537 X |
| 2,511,074 | 6/1950 | Miller | 52—537 X |
| 3,132,446 | 5/1964 | Schleig | 52—537 |
| 3,188,131 | 6/1965 | Attwood | 52—537 X |

FOREIGN PATENTS

| | | | |
|---|---|---|---|
| 807,029 | 1/1959 | Great Britain | 52—537 |
| 288724 | 3/1965 | Netherlands | 52—537 |

FRANK L. ABBOTT, Primary Examiner

H. E. RADUAZO, Assistant Examiner

U.S. Cl. X.R.

52—478, 520

UNITED STATES PATENT OFFICE
CERTIFICATE OF CORRECTION

Patent No. 3,660,482  Dated May 2, 1972

Inventor(s) Eduardo Delfin Elizalde

It is certified that error appears in the above-identified patent and that said Letters Patent are hereby corrected as shown below:

In column 5, line 22, numeral "6" should read --5--. In column 6, line 68, " c " should read --c'--. In column 7, line 53, cancel "attaching auxiliary means and aparatus to" and insert --divisional structures, for instance roofs,--; line 58, "floor" should read --roof--. In column 9, line 57, after "transverse" insert --portion--; line 65, after "channel" insert --insert--. In column 10, line 8, after "between" insert --a line 7--; line 18, "b" should read --$b_t$--; line 19, after "channel" (second occurrence) insert --insert--. In column 12, line 59, "projecting" should read --projection--.

Signed and sealed this 2nd day of January 1973.

(SEAL)
Attest:

EDWARD M. FLETCHER, JR.
Attesting Officer

ROBERT GOTTSCHALK
Commissioner of Patents